United States Patent
Allen

(10) Patent No.: US 6,259,891 B1
(45) Date of Patent: *Jul. 10, 2001

(54) ADAPTER AND METHOD FOR USE IN A PORTABLE COMMUNICATION SIGNAL RECEIVER SYSTEM

(75) Inventor: James D. Allen, Westlake Village, CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,863

(22) Filed: Sep. 4, 1997

(51) Int. Cl.$^7$ .................................. H04H 1/00; H04N 7/00
(52) U.S. Cl. .................... 455/3.02; 455/557; 455/12.1; 725/66; 725/121
(58) Field of Search ............................ 455/433, 435, 455/445, 466, 550, 552, 553, 554, 557, 560, 427, 2.01, 3.02, 3.04, 3.05, 3.06, 571, 66, 12.1, 13.1; 725/66, 63, 121, 105, 1, 123, 131, 139, 110

(56) References Cited

U.S. PATENT DOCUMENTS

| | | | |
|---|---|---|---|
| 5,121,211 | | 6/1992 | Koo . |
| 5,179,444 | | 1/1993 | Koo . |
| 5,282,238 | * | 1/1994 | Berland ................................ 455/557 |
| 5,353,331 | * | 10/1994 | Emery et al. ......................... 455/445 |
| 5,509,004 | * | 4/1996 | Bishop, Jr. et al. .................... 455/12 |
| 5,579,367 | * | 11/1996 | Raymond et al. .................... 455/12.1 |
| 5,664,004 | * | 9/1997 | Durchman et al. ................... 455/466 |
| 5,812,931 | * | 9/1998 | Yuen .................................... 725/123 |
| 5,862,324 | * | 1/1999 | Collins ................................. 725/131 |
| 6,018,768 | * | 1/2000 | Ullman et al. ........................ 725/110 |
| 6,061,056 | * | 5/2000 | Menard et al. ....................... 725/139 |

* cited by examiner

*Primary Examiner*—Lester G. Kincaid
(74) *Attorney, Agent, or Firm*—John A. Crook; Michael W. Sales

(57) ABSTRACT

A communication signal adapter is connected between a portable satellite signal receiver/decoder and a wireless local area network (LAN) transceiver to enable wireless communication between the portable satellite signal receiver/decoder and a wireless LAN. The adapter includes a modem interface adapter and a communications processor that converts information, such as callback data and viewer statistical data, developed by the satellite signal receiver/decoder in a proprietary format, to a data format that is suitable for transmission via the wireless LAN transceiver and then provides the converted data to the wireless LAN transceiver for communication to the LAN. The adapter also includes a microprocessor that controls text insertion control circuitry which is used to convert data signals, such as text messages, delivered from the wireless LAN into signals that are suitable for display on a television and which also inserts the converted text messages into a video signal developed by the portable satellite signal receiver/decoder for display on a standard television.

27 Claims, 3 Drawing Sheets

ADAPTER AND METHOD FOR USE IN A PORTABLE COMMUNICATION SIGNAL RECEIVER SYSTEM

BACKGROUND OF THE INVENTION (a) Field of the Invention

This invention relates generally to communication systems and, more particularly, to a portable communication signal adapter that enables communication between a portable communication signal receiver/decoder and a wireless local area network.

(b) Description of Related Art

Due to advances in satellite technology, including, for example, increased signal strength and reduced antenna size, communication signal receiver systems, such as satellite television signal receivers, are becoming increasingly more compact and easily transportable. As a result, satellite television reception is no longer restricted to permanent installations. In particular, portable satellite television signal receiver systems can now be installed in recreational vehicles, such as campers and boats, to provide satellite access to the mobile community.

Currently available mobile communication signal receiver systems (such as mobile satellite television signal receiver systems) generally require, at a minimum, a parabolic dish or other antenna that can typically be repositioned for maximum reception, a satellite communication signal decoder (such as an integrated receiver/decoder (IRD)), a television monitor and a portable power supply. The antenna receives the satellite signal which is then passed through a coaxial cable to the IRD where it is converted to a format suitable for display on a television monitor. In advanced portable satellite receiver systems, the receiver components may be housed within a single unit to further augment transportability.

However, portable satellite receiver technology presents challenges that are not typically encountered by viewers with permanently installed receiver systems. For example, callback data including subscriber billing information and viewing statistics is not easily retrieved from the mobile community because retrieval requires a communication link between the mobile subscriber's portable IRD and the service provider's callback system. Modern cellular telephone systems that enable wireless data transfer via cellular modem technology offer one possible communication method for callback data retrieval. However, to effect such communication, a satellite television signal subscriber must also subscribe to a cellular telephone service and the mobile television subscriber must be situated within the telephone service territory to effect the data transfer.

Furthermore, known portable satellite signal receiver systems are generally limited to receiving information provided by the satellite service with which they are associated. Satellite services, which tend to cover large geographic regions, typically only provide standard broadcast programming and are unlikely to supply local information or other information targeted specifically to the mobile subscriber. The mobile subscriber would benefit, however, from access to a supplemental information system that has localized storage and distribution capabilities. For example, a campground inhabitant would benefit from having access to information about local tourist events, campground site availability, local automobile service stations, etc.

One localized storage and distribution network that is currently available utilizes local area network (LAN) technology to enable multi-user access to local information. In a typical LAN configuration, a server stores user specific information that may be accessed via a connected terminal. While, in some instances, wireless LANs are available to distribute information to standard computer terminals, wireless LANs are not presently accessible to portable IRDs due to incompatibilities between their respective protocols. Therefore, these LAN systems are not accessible by the mobile satellite television signal subscriber without an additional standard computer terminal specifically configured for communication with a wireless LAN.

SUMMARY OF THE INVENTION

In accordance with the present invention, a communication signal adapter enables wireless communication between a portable communication signal integrated receiver/decoder (IRD), such as a mobile (IRD), and a wireless local area network to enable a mobile subscriber to send billing information, requests for programming changes, etc. to the communication signal service provider.

Preferably, the communication signal adapter of the present invention is coupled between a wireless local area network (LAN) transceiver unit and a communication signal receiver/decoder, to convert information signals generated by the communication signal receiver/decoder into a format that is compatible with the protocol of the LAN transceiver unit. To perform the conversion, the adapter includes an input port for receiving an information signal from the communication signal receiver/decoder, a processor that converts the information signal to a format that is compatible with the protocol of the LAN transceiver unit and an output port through which the converted information signal is delivered to the LAN transceiver unit.

The information signal may comprise billing information and/or viewer statistical information related to the communication signal receiver/decoder and may be in a tone coded telephone signal format which the processor converts to a binary format used by the transceiver unit. Preferably, the transceiver unit communicates with a wireless LAN network which may, in turn, be coupled to a standard telephone network. In such a case, the LAN transceiver unit communicates with a television signal service provider to supply billing information and/or viewer statistical information to the service provider.

The adapter of the present invention may also be coupled to a display device, such as a television, and may be capable of combining a communication signal, such as a television or other video signal, generated by the communication signal receiver/decoder, with a data signal, such as a text message or an electronic mail (e-mail) message provided by the transceiver unit. To combine the communication and data signals, the adapter may include a processor coupled between a memory and text insertion circuitry. Preferably, the text insertion circuitry includes a text format controller that converts the text message into a video format, a switch that enables text insertion in a first position and that inhibits text insertion in a second position, and a picture-in-picture text insertion unit. When the switch is set so that text insertion is disabled, the video signal generated by the receiver/decoder is passed through the adapter unaltered. Otherwise, the picture-in-picture text insertion unit inserts the formatted text message into the video signal generated by the receiver/decoder and provides such combined signal to a television for display.

If desired, the communication signal receiver/decoder may control the adapter. In such a case, the adapter converts a control signal generated by the communication signal receiver/decoder to a format that is compatible with the protocol of the processor and transfers the decoded signal to the processor to cause the processor to effect, for example, message retrieval and display.

The present invention combines the wide area broadcast capability of satellite systems with the "local" nature of wireless LAN or other local wireless distribution capabilities to provide a seamless, personalized data distribution system to the end user. In particular, the system improves upon the versatility of conventional satellite receiver systems by supporting the distribution of locally generated/personalized data that has been integrated with non-local information intended for the general public or general satellite service subscriber.

DESCRIPTION OF THE PREFERRED EMBODIMENTS

Figure 1:
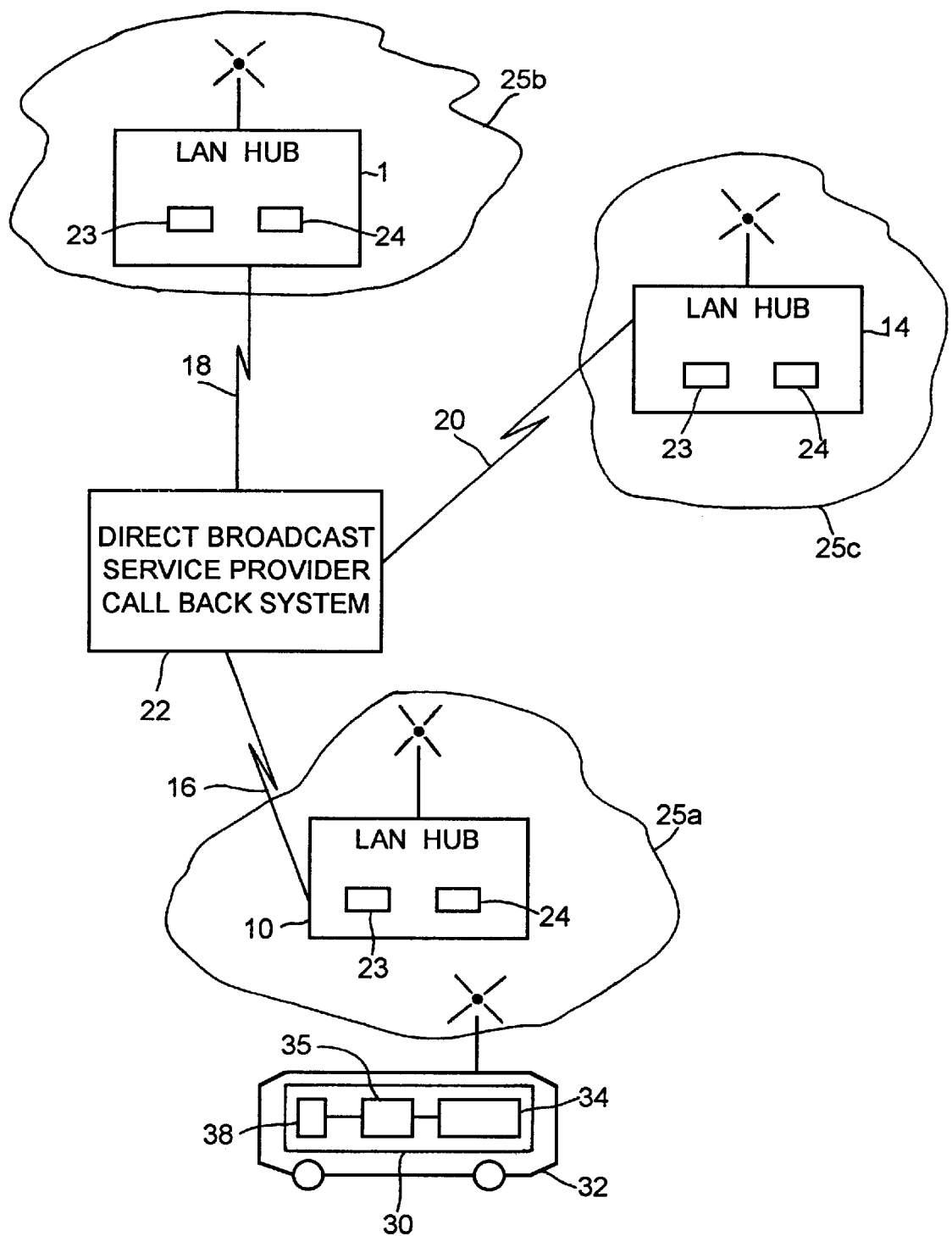
FIG. 1 is a block diagram of a wireless LAN distribution system in conjunction with a portable satellite signal receiver system.

Referring now to FIG. 1, a set of local area network (LAN) hubs 10, 12, 14 are shown connected via standard telephone lines 16, 18, 20 to a callback system 22 associated with a satellite video service provider, such as a direct broadcast service (DBS) provider. Each LAN hub 10–14 is equipped with a LAN server 23 and a wireless LAN transceiver hub 24 that transmits and receives information, such as digital data, within a region called a service area 25a, 25b, 25c. Although each service area 25a–25c is typically three to five miles or less in radius, strategic placement of the LAN hubs 10–14 may be used to effect distribution to any size geographic region, such as a nationwide, a state-wide, a city-wide, etc. distribution region. Further, the distribution region need not be continuous, but may instead, service cities or regions that are remote from one another.

A portable communication signal receiver system 30, which may comprise a satellite video signal receiver system, is installed in a mobile recreational vehicle 32 and includes a wireless LAN transceiver 34 connected to an adapter 35 which, in turn, is connected to a receiver system, such as a satellite video signal IRD 38. When situated within the service area of, for example, the hub 10, the wireless LAN transceiver 34 aboard the recreation vehicle 32 automatically establishes a network connection with the LAN hub 10 to enable two-way wireless communication between the portable satellite receiver system 30 and the LAN server 23 associated with the hub 10. For maximum access to the mobile community, the LAN hubs 10–14 are ideally located in areas frequented by recreational vehicles, for example, interstate highway rest areas or campground lodges, but may instead, be located in any other desired location.

Using the wireless LAN connection illustrated in FIG. 1, the callback system 22 associated with the DBS provider can retrieve callback data, including, for example, billing information and viewing statistics, from the portable satellite receiver system 30. In addition, the portable satellite receiver system 30 may receive data messages, such as e-mail messages, local information pertaining to, for example, hotel/motel campground availability, local activities, etc., or any other desired information from the LAN server 23.

Figure 2:
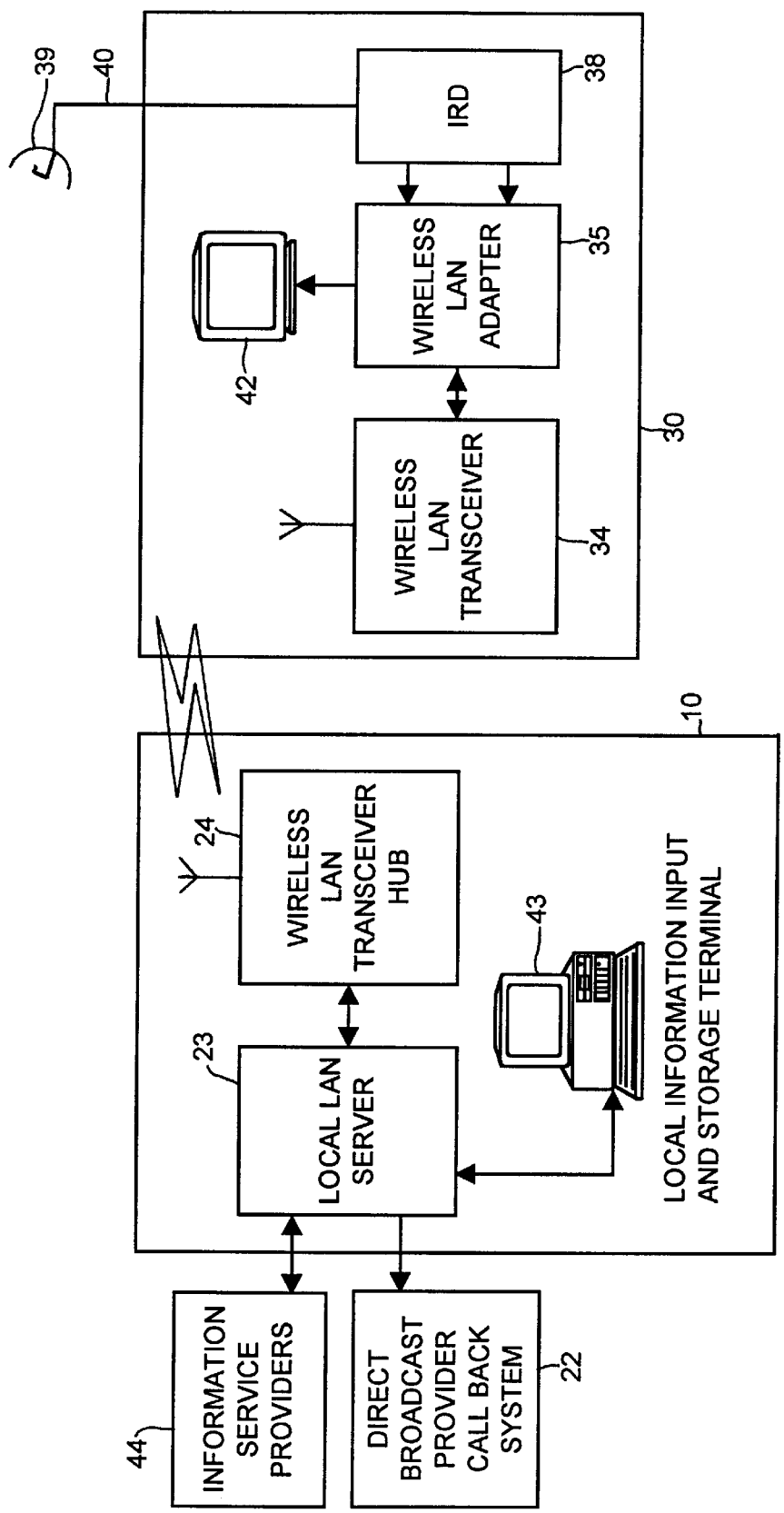
FIG. 2 is a block diagram of a wireless LAN hub and a portable satellite signal receiver system including an adapter according to the present invention.

FIG. 2 illustrates the operation of the portable satellite receiver system 30 in combination with the LAN hub 10 of FIG. 1. An antenna 39, which may be a parabolic dish or other type of antenna, receives a communication signal, for example, a satellite television signal, and passes this signal through a coaxial cable 40 to the IRD 38 where it is decoded using any standard decoding technique. The IRD 38 transmits the decoded television signal to the adapter 35 which routes this signal to a subscriber television 42 for display. In addition, the IRD 38 may store callback data and/or generate control signals to control the adapter 35.

The adapter 35 performs signal conversion to achieve signal compatibility between the respective protocols of the IRD 38 and the wireless LAN transceiver 34. For example, the adapter 35 may convert an information signal (which may include callback data, viewer statistics, etc.) generated by the IRD 38 in a proprietary protocol to a binary data or other signal format used by the wireless LAN transceiver 34. In addition, the adapter 35 may convert a data signal (such as a text message) supplied by the wireless LAN transceiver 34 to a format suitable for display on a television, may combine this converted data signal with the television signal generated by the IRD 38 to produce a communication signal and may then provide the resulting communication signal to the television 42 for display. Alternatively, the adapter 35 may store the data signal received from the wireless LAN transceiver 34 for future display. To retrieve stored data signals or messages, the mobile subscriber enters a retrieval command at the IRD 38 using, for example, a remote control unit. In response to the entered command, the IRD 38 generates control signals that the adapter 35 converts into a non-proprietary protocol which may then be used by the adapter 35 to effect, for example, display of the stored messages. In this manner, the signal conversion capabilities of the adapter 35 enable wireless communication between the portable satellite receiver system 30 and the wireless LAN hub 10 and enable the storage and display of messages received from the wireless LAN hub 10.

As will be understood, the LAN transceiver 34 may communicate with the wireless LAN transceiver hub 24 of the LAN hub 10 using any known or desired protocol. As illustrated in FIG. 2, the transceiver hub 24 of the LAN hub 10 is coupled to and communicates with the local LAN server 23 which, in turn, is connected to a local information input and storage terminal 43, information service providers 44 and the callback system 22 via any desired data links, such as telephone links, standard LAN connections, RS-232 links, etc. The LAN server 23 stores data or other information including, for example, information tailored to the mobile community (e.g., notification of campground events or campsite availability) and/or messages that may address all subscribers, a limited group of subscribers or an individual subscriber. The locally generated data described above is entered into the server 23 via the local information input and storage terminal 43 which is also used for maintenance and control of the LAN server 23. The LAN server 23 may also store non-locally generated information supplied by the information service providers 44 or the DBS provider 22 through a callback system connection line such as telephone line 16. In addition, the local information input and storage terminal 43 may be used to combine the non-locally generated information supplied by the DBS provider 22 or the information service providers 44 with the locally generated data entered at the local information and input storage terminal 43. Thus, non-locally generated messages and/or information may be personalized for, or tailored to the local subscriber by combining the messages with locally generated data, thereby enabling the integration of non-local information generating systems, such as the DBS provider callback system 22 and the information service providers system 44, with local data systems, such as the LAN 10. The transceiver hub 24 then transmits the stored and/or combined information to the portable satellite receiver system 30 periodically or at any convenient time.

In addition, the LAN server 23 communicates with the callback system 22 of the DBS provider to supply subscriber callback data retrieved from the portable satellite receiver system 30 via the wireless LAN connection. Likewise, the LAN server 23 communicates with the information service providers 44 to supply, for example, e-mail service, etc. to the portable satellite receiver system 30.

Figure 3:
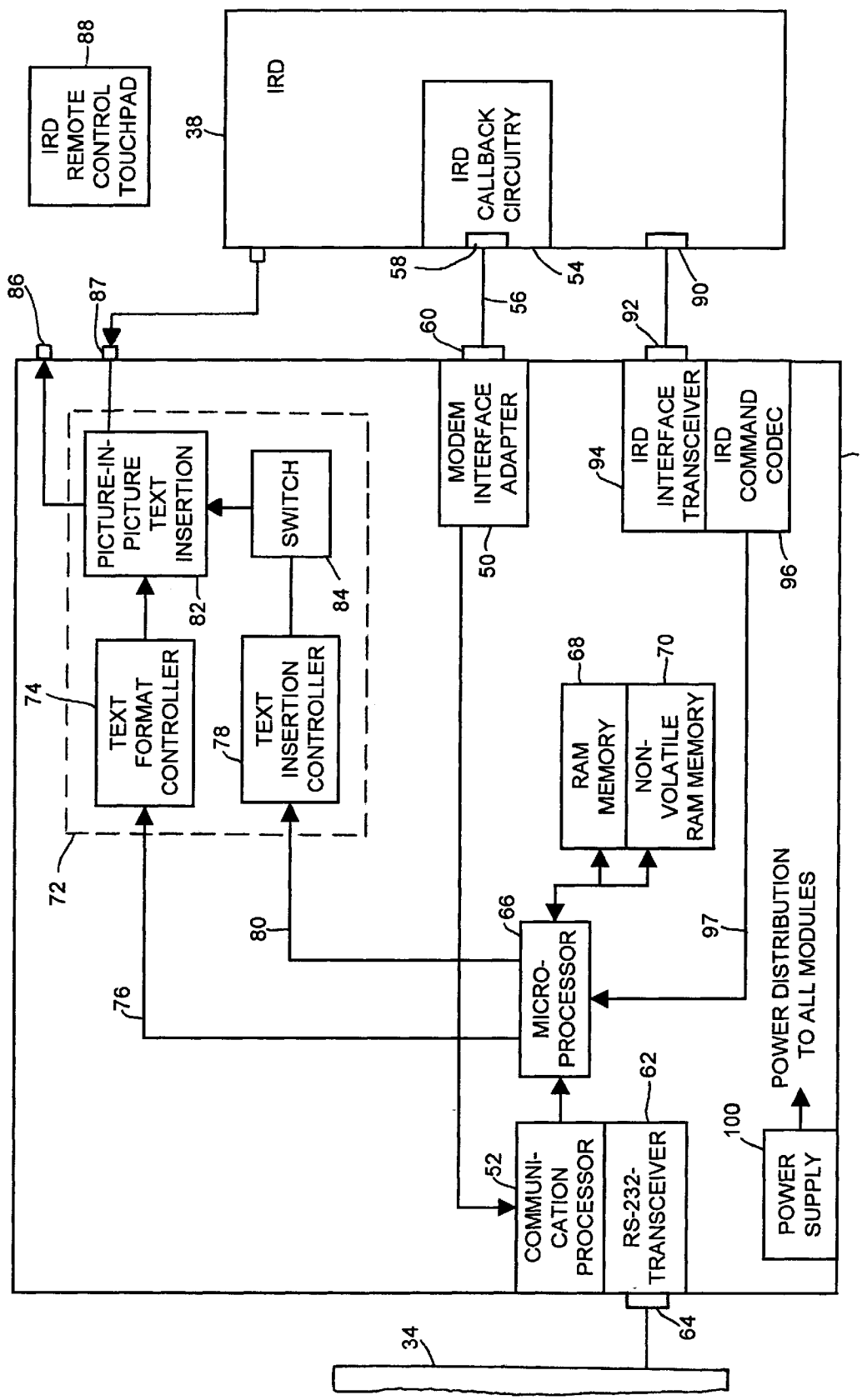
FIG. 3 is a block diagram of one embodiment of the adapter according to the present invention.

FIG. 3 illustrates the components of the adapter 35 as well as the connections between the adapter 35, the IRD 38, and the wireless LAN transceiver 34. The adapter 35 includes a modem interface adapter 50 and a communication processor 52 which operate to convert an information signal (e.g., callback data) developed by IRD callback circuitry 54 from an IRD proprietary protocol to a signal format that is suitable for transmission via the wireless LAN. To enable signal transfer between the IRD 38 and the adapter 35, a standard telephone cord 56 connects a telephone jack 58 associated with the IRD callback circuitry 54 to a DB-11 telephone jack 60 on the modem interface adapter 50. The communication processor 52 is coupled between the modem interface adapter 50 and an RS-232 transceiver 62 that is linked via a DB-15 output port 64 to the wireless LAN transceiver 34. In response to a satellite transmission instructing the IRD 38 to transmit callback data, the IRD callback circuitry 54 attempts to call a pre-stored telephone number for the DBS provider callback system 22 (FIG. 1) through the telephone jack 58. Provided that the wireless LAN transceiver 34 is within range of and has established a connection with the wireless LAN transceiver hub 24 associated with, for example, the hub 10, the modem interface adapter 50 emulates a standard telephone connection to provide a dial tone. The IRD 38 responds to the dial tone by transmitting a tone coded telephone information signal including the callback data through the telephone cord 56 to the telephone jack 60 of the modem interface adapter 50. If the wireless LAN transceiver 34 is not within range of or has not established a connection with the wireless LAN transceiver hub 24, the modem interface adapter 50 will not provide a dial tone and the IRD 38 will cease transmission. In the absence of a dial tone, the IRD 38 will attempt callback at regular intervals until a connection is established.

In the event that a dial tone is provided and the modem interface adapter 50 receives the IRD callback data information signal, the interface adapter 50 demodulates and converts the received information signal to a binary form and delivers this binary data signal to the communication processor 52. The modem interface adapter 50 may be implemented using any standard, commercially available chip that performs telephone signal demodulation including, for example, a Silicon Systems SI 73k2220 with UART.

The communication processor 52 multiplexes the binary data into a fixed rate parallel format that is compatible with the protocol of the wireless LAN transceiver 34. The specifics of such a conversion routine are well known in the art and may, for example, be implemented by the processor 52 using standard program software. As a result, this conversion routine is not described further herein. The processor 52 then transfers the converted data to the RS-232 transceiver 62 where it is delivered to the wireless LAN transceiver 34 for subsequent transmission to the LAN server 23 and then to the callback system 22 via a standard telephone line connection 16 (FIG. 1). Of course, the callback data (or other data) may be converted back into a proprietary format at any convenient location including at the local LAN server 23 and/or at the callback system 22.

In addition to converting callback data, the adapter 35 may convert a data signal received from the wireless LAN transceiver 34 to a format that is suitable for display on the subscriber television 42. To effect data display, the wireless LAN adapter 35 includes a microprocessor 66 coupled between the communication processor 52, a RAM memory 68, a non-volatile RAM memory 70 and text insertion control circuitry 72. The text insertion control circuitry 72 may include a text format controller module 74 connected to the microprocessor 66 via a text data bus 76, a text insertion control module 78 connected to the microprocessor 66 via a text insertion control bus 80 and a picture-in-picture text insertion module 82 coupled to the module 78 via a hardware control switch 84. The picture-in-picture text insertion module 82 accepts a data, audio, or video signal from the text format controller module 74, the text insertion control module 78 and the IRD 38 and includes an output port 86 that is connected to the subscriber television 42 (FIG. 2).

During operation, the local LAN server 23 transmits a data signal via the wireless LAN to the wireless LAN transceiver 34. As is conventional for wireless LAN technology, a message or data signal may be addressed to all subscribers located within the service area 25a or may be addressed to a subset thereof. The wireless LAN transceiver 34 receives the transmitted data signal that may include, for example, messages from the DBS provider callback system 22, e-mail from information service providers 44, the personalized data entered via the local information input and storage terminal 43 at the LAN hub 10 (FIG. 2), or a message containing DBS provider callback system 22 information combined with the personalized or local data entered at the local information input and storage terminal 43 (FIG. 2). The wireless LAN transceiver 34 delivers the data signal to the RS-232 transceiver 62. Thereafter, the RS-232 transceiver 62 transfers the data signal to the communication processor 52 where it is routed to the microprocessor 66. If desired, microprocessor 66 sorts the received data signal by priority based on a priority level assigned by the LAN server 23. The LAN server 23 may employ a standard priority scheme that ranks each data signal according to importance and embeds a priority level into the data signal prior to transmission in any desired manner. Data signals bearing non-urgent messages, such as a list of tourist sites, are assigned a low priority, whereas data signals bearing urgent messages are assigned a high priority. The microprocessor 66 is programmed to recognize the embedded priority levels of the signals and respond accordingly. For example, a data signal bearing a low priority may cause the microprocessor 66 to place the associated message in the RAM memory 68 for future retrieval, whereas the message associated with a high priority data signal may be transferred in real time to the text insertion control circuitry 72 for immediate display. For enhanced security, the microprocessor 66 may be programmed to store a message associated with a high priority data signal in the non-volatile RAM memory 70 and then display an announcement on the subscriber television 42 to inform the subscriber of the arrival of the message.

To effect message display, the microprocessor 66 sends a received data signal to the text format controller module 74 via the text data bus 76. The text format controller module 74 converts the data signal to a video signal that includes, for example, displayable text with colorization, borders, underlining and graphics, as required. The formatted video signal is then output to the picture-in-picture text insertion module 82.

Additionally, the microprocessor 66 sends a control signal over the text insertion control bus 80 to the text insertion control module 78 which, in turn, controls the hardware switch 84 on the picture-in-picture text insertion module 82. Upon actuation of the hardware switch 84, the picture-in-picture text insertion module 82 inserts the video signal generated by the text format controller module 74 into the video signal provided by the IRD 38 at an input port 87. The resulting video signal with inserted text is then output to the subscriber television 42 (FIG. 2) via the port 86. In the absence of a control signal that actuates the control switch 84, the picture-in-picture text insertion module 82 passes the video signal from the IRD 38 unaltered to the subscriber television 42.

Standard, commercially available text insertion control circuitry 72 may be used to insert the video signal with the text message into the video signal provided by the IRD 38. For example, such circuitry is routinely employed to effect on-screen display of a selected channel number. In the alternative, closed caption circuitry may be used to scroll the message across the bottom of the television display or other circuitry may be used to display the message in any other desired format. In fact, the standard text insertion control circuitry 72 is not limited to inserting text. Rather, the inserted data signal may include compressed video and/or graphics. In addition, audio insertion circuitry may be included to support audio message retrieval.

To retrieve and display messages received from the LAN server 23 that have been stored by the microprocessor 66 in the memory 68 or 70, the subscriber commands the IRD 38 to display a message using, for example, an IRD remote control touchpad 88. In response to the command signal from the remote control touchpad 88, the IRD 38 generates a control signal that is transmitted through an IRD input/output DB-15 port 90 to a DB-11 telephone jack 92 of the adapter 35. Alternatively, the adapter may be configured to include circuitry to receive control signals generated by the IRD remote control key pad directly. To process the control signal, the adapter 35 includes an IRD interface transceiver 94 coupled between the telephone jack 92 and an IRD command codec 96 which is, in turn, coupled to the microprocessor 66. The interface transceiver 94 receives the control signal from the IRD 38 through the telephone jack 92 and routes the signal to the IRD command codec 96 where it is converted to a non-proprietary data format that is compatible with the data format associated with the microprocessor 66. Any standard, commercially available PROM chip programmed with the specialized command set associated with the IRD 38 may be used to implement the IRD command codec 96. The IRD command codec 96 delivers the converted control signal to the microprocessor 66 via an IRD command bus 97 to cause the microprocessor 66 to retrieve the desired message from the memory 68 or 70 and to display such message using the insertion procedure described earlier. Thus, the signal insertion circuitry described above, may be used to combine the personalized, locally generated data entered at the LAN hub 10 with the DBS provided programming to support the integration and distribution of local and non-local data.

In addition to the features described above, the adapter system of the present invention may be configured to provide customer identification information to the LAN server 23 upon establishing a connection with, for example, the wireless LAN hub 10. In response, the LAN server 23 can supply a data signal, such as a welcome message, to the mobile subscriber. Alternatively, the LAN server 23 may use the identification information to personalize messages sent from the DBS provider via the callback system 22 prior to transmission to the portable receiver system 30. The wireless LAN adapter 35 also enables subscriber access to e-mail messages that have been retrieved by the LAN server 23 from a national information service provider 44 via the standard telephone line connection 16 that links the LAN server 23 to the information provider 44 (FIG. 2). The wireless LAN transceiver hub 24 transmits the e-mail message stored on the LAN server 23 to the adapter 35 of the portable satellite receiver system 30 where the text message is stored for future retrieval and display as described above. In addition, standard commercially available IRD remote control touchpads 88 capable of performing the data retrieval requests described herein are currently available for use in non-wireless, stationary communication signal receiver systems.

To support installation in the recreational vehicle 32, the wireless LAN adapter 35 is equipped with, for example, a 12 VDC power supply 100 that can accept a 12 VDC battery or a 120 VAC adapter plug and that provides power distribution to all of the wireless LAN adapter 35 modules. In addition, both the RS-232 transceiver 62 and the IRD interface transceiver 94 provide voltage isolation protection for the wireless LAN adapter 35.

Although the preferred embodiment of the present invention is a stand-alone adapter for use with a separate IRD, it should be understood that the adapter circuits and functions described could, in other embodiments, be incorporated into an IRD or other receiving device. Further, although preferred uses are in connection with mobile operations, the present invention may be used in stationary applications as well.

While the present invention has therefore been described with reference to specific examples, which are intended to be illustrative only, and not to be limiting of the invention, it will be apparent to those of ordinary skill in the art that changes, additions, and/or deletions may be made to the disclosed embodiments without departing from the spirit and scope of the invention.

What is claimed is:

1. An adapter capable of being coupled between a wireless local area network and a satellite integrated receiver/decoder, comprising:

first means for receiving an information signal from the satellite integrated receiver/decoder in a telephone network format suitable for transmission via a telephone network;

means for converting the information signal to a computer interface format that is compatible with a wireless local area network protocol; and means for delivering the converted information signal in the computer interface format that is compatible with the wireless local area network protocol to the wireless local area network.

2. The adapter of claim 1, wherein the telephone network format is a tone coded telephone signal format and wherein the computer interface format is a binary data signal format.

3. The adapter of claim 2, wherein the information signal comprises billing information related to the satellite integrated receiver/decoder.

4. The adapter of claim 2, wherein the information signal comprises viewer statistical information related to the satlite integrated receiver/decoder.

5. The adapter of claim 1, wherein the information signal comprises billing information related to the satellite integrated receiver/decoder.

6. The adapter of claim 1, wherein the adapter is capable of being coupled to a display device, and further comprising second means for receiving a first communication signal from the satellite integrated receiver/decoder, third means for receiving a data signal from the local area network, means for combining the data signal with the fit communication signal to produce a second communication signal, and means for transmitting the second communication signal to the display device.

7. The adapter of claim 6, wherein the third receiving means includes a processor that controls the combining means.

8. The adapter of claim 7, further comprising fourth means for receiving a control signal from the satellite integrated receiver/decoder in a first format, further means for converting the control signal to a second format, and means for delivering the control signal in the second format to the processor.

9. The adapter of claim 6 wherein the third receiving means includes a memory that stores the data signal.

10. The adapter of claim 6, wherein the first communication signal is a video signal, wherein the data signal is a text message, and wherein the combining means includes a text format controller that converts the text message into a video format.

11. The adapter of claim 6, wherein the combining means includes a picture-in-picture insertion unit.

12. The adapter of claim 6, wherein the satellite integrated receiver/decoder is adapted to receive and decode video signals, and wherein the first and second communication signals are video signals.

13. The adapter of claim 6, wherein the data signal is an e-mail message.

14. A direct broadcast satellite (DBS) video communication system adapted to be coupled to a display device the communication system comprising:
 a satellite integrated receiver/decoder;
 a wireless local area network transceiver; and
 an adapter coupled between the satellite integrated receiver/decoder and the wireless local area network transceiver, said adapter including:
  first means for receiving a first video signal from the satellite integrated receiver/decoder;
  second means for receiving a data signal from the wireless local area network transceiver;
  means for combining the data signal with the first video signal to produce a second video signal;
  means for transmitting the second video signal to the display device;
  further means for receiving an information signal from the satellite integrated receiver/decoder in a first format suitable for transmission by a telephone network;
  means for converting the information signal to a second format suitable for transmission by a wireless local area network; and
  means for delivering the information signal in the second format to the wireless local area network transceiver.

15. The DBS video communication system of claim 14 wherein the information signal comprises billing information related to the first video signal.

16. The DBS video communication system of claim 14, wherein the data signal is a text message and wherein the combining means includes a text format controller that converts the text message into a video format.

17. The DBS video communication system of claim 14, wherein the combining means includes a picture-in-picture insertion unit.

18. A portable communication system adapted to be coupled between a wireless local area network transceiver and a display device, the communication system comprising:
 a satellite integrated receiver/decoder;
 first means for receiving a first video signal from the satellite integrated receiver/decoder;
 second means for receiving a data signal from the wireless local area network transceiver;
 means for combining the data signal with the first video signal to produce a second video signal;
 means for transmitting the second video signal to the display device;
 further means for receiving an information signal from the satellite integrated receiver/decoder in a first format suitable for transmission by a telephone network;
 means for converting the information signal to a second format suitable for transmission by a wireless local area networks; and
 means for delivering the information signal in the second format to the wireless local area network transceiver.

19. The portable communication system of claim 18 wherein the information signal comprises billing information related to the first video signal.

20. The portable communication system of claim 18, wherein the data signal is a text message and wherein the combining means includes a text format controller that converts the text message into a video format.

21. The portable communication system of claim 18, wherein the combining means includes a picture-in-picture insertion unit.

22. An adapter capable of being coupled between a wireless local area network transceiver unit and satellite integrated receiver/decoder and further being capable of being coupled to a display device, comprising:
 first means for receiving an information signal from the satellite integrated receiver/decoder in a first format suitable for transmission via a telephone network;
 means for converting the information signal to a second format suitable for transmission via a wireless local area network;
 means for delivering the converted information signal in the second format to the wireless local area network transceiver unit;
 second means for receiving a first communication signal from the satellite integrated receiver/decoder, wherein the first communication signal is a video signal;
 third means for receiving a data signal from the wireless local area network transceiver unit, wherein the data signal is a text message;
 means for combining the data signal with the first communications signal to produce a second communication signal, wherein the combining means includes a text format controller that converts the text message into a video format and further wherein the combining means includes a switch that switches the combining means between a first state in which the combining means combines the text message in the video format with the first communication signal to produce the second communication signal, and a second state in which the combining means passes the first communication signal unaltered as the second communication signal; and means for transmitting the second communication signal to the display device.

23. A method for enabling communication between a satellite integrated receiver/decoder and a wireless local area network, the method comprising the steps of:

receiving an information signal from the satellite integrated receiver/decoder wherein the information signal is in a telephone network format suitable for transmission via a telephone network;

converting the information signal to a computer interface format that is compatible with a wireless local area network protocol; and delivering the converted information signal in the computer interface format that is compatible with the wireless local area network protocol to the wireless local area network.

24. The method of claim 23 wherein the information signal comprises billing information related to the satellite integrated receiver/decoder.

25. The method of claim 23 wherein the information signal comprises viewer statistical information related to the satellite integrated receiver/decoder.

26. The method of claim 23 further comprising the steps of:

receiving a first communication signal from the satellite integrated receiver/decoder;

receiving a data signal from the local area network;

combining the first communication signal with the data signal to form a second communication signal; and delivering the second communication signal to a display device.

27. A method for enabling communication between a satellite integrated receiver/decoder and a local area network, the method comprising the steps of:

receiving an information signal from the satellite integrated receiver/decoder wherein the information signal is in a first format;

converting the information signal to a second format; and delivering the converted information signal in the second format to the local area network wherein the step of delivering the converted information signal in the second format to the local area network comprises:

converting the information signal in the second format to a third format suitable for transmission via a first wireless transceiver;

delivering the information signal in the third format to the first wireless transceiver;

causing the wireless transceiver to deliver the information signal in the third format to a second wireless transceiver;

causing the second wireless transceiver to convert the information signal in the third format to the second format; and causing the second wireless transceiver to convert the information signal in the second format to the local area network.

* * * * *